United States Patent
Patchen

[15] 3,678,147
[45] July 18, 1972

[54] METHOD FOR MAKING REINFORCED GRATING

[72] Inventor: Lee H. Patchen, Drawer G, Knoxville, Ark. 72845

[22] Filed: April 13, 1970

[21] Appl. No.: 27,725

[52] U.S. Cl...........................................264/325, 264/277
[51] Int. Cl......................................................B29c 11/00
[58] Field of Search.........................................264/325, 277

[56] References Cited

UNITED STATES PATENTS

| | | | |
|---|---|---|---|
| 3,423,494 | 1/1969 | Roberts | 264/277 |
| 3,516,758 | 6/1970 | Dickey | 260/29.2 |
| 2,975,500 | 3/1969 | Hosbein | 264/277 |

Primary Examiner—Robert F. White
Assistant Examiner—J. R. Hall
Attorney—Dawson, Tilton, Fallon & Lungmus

[57] ABSTRACT

A method of forming a plastic grating reinforced with longitudinally and transversely extending rows of strands or filaments, each of the rows of filaments comprising a plurality of spaced-apart generally aligned filaments. The openings of the grating are provided through the areas defined by intersecting rows of filaments. The grating is formed by introducing a predetermined amount of resin material into a pan mold, and then lowering a lattice of intersecting rows of filaments into the mold. Thereafter, a mold core which includes vertically extending fingers shaped to be received by the vertically extending openings in the lattice is lowered into the mold to raise the level of the resin material to cover the filaments. After the resin material is hardened, the mold core is raised and the grating is removed from the pan mold.

6 Claims, 8 Drawing Figures

Patented July 18, 1972
3,678,147
2 Sheets-Sheet 1
FIG. 1
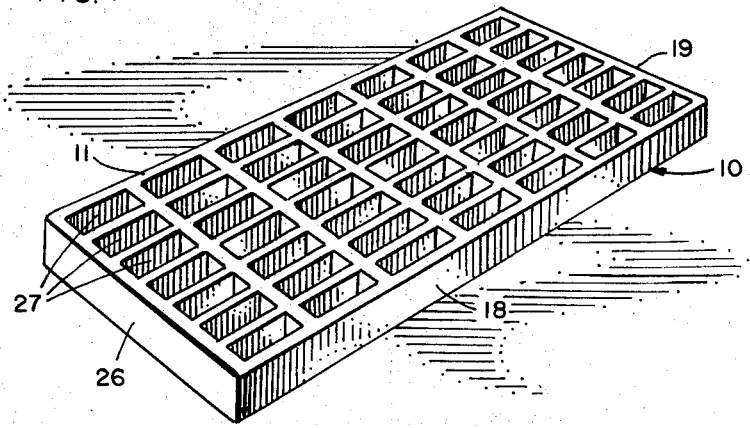
FIG. 2
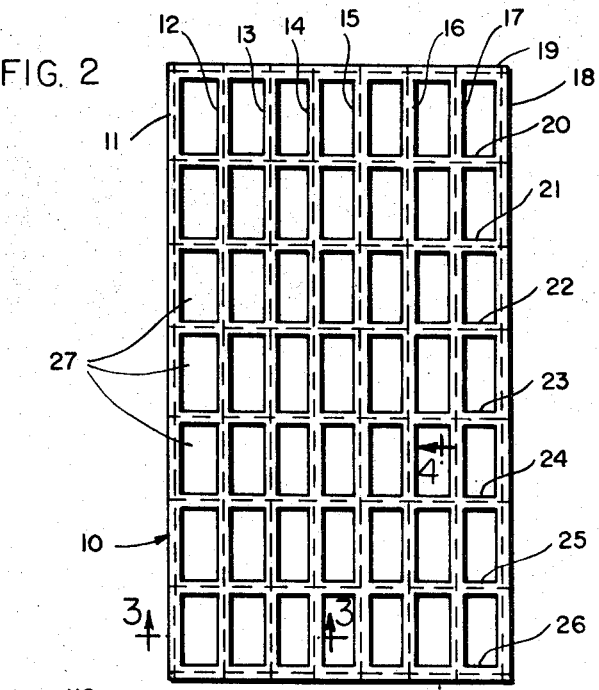
FIG. 3
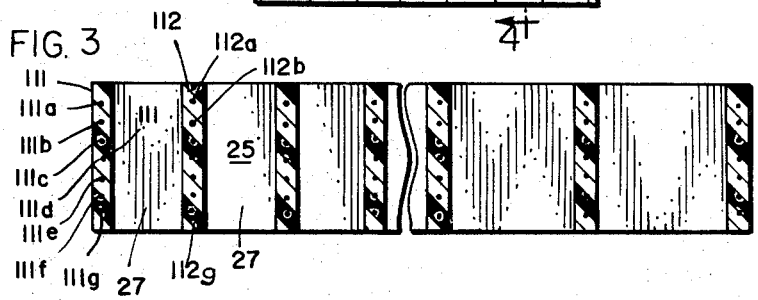
FIG. 4
INVENTOR
LEE H. PATCHEN
BY
Dawson, Tilton, Fallon & Lungmus
ATT'YS

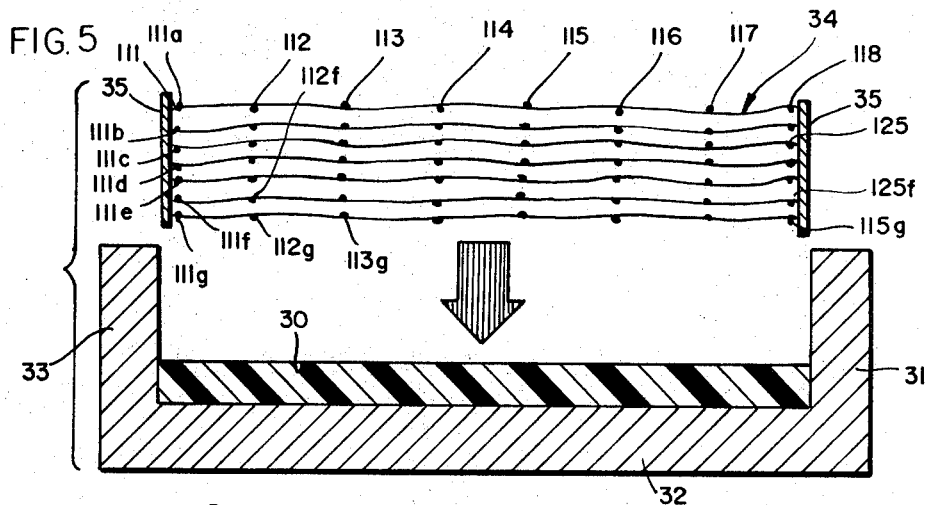
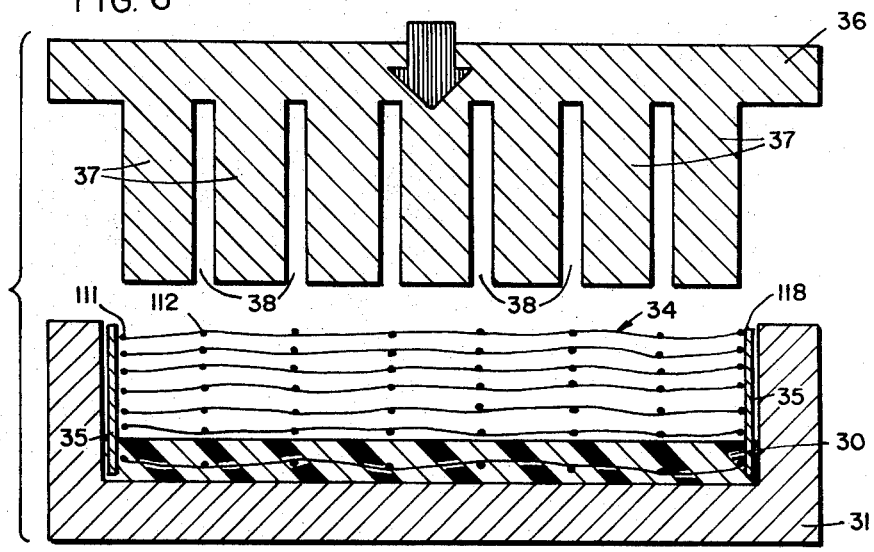
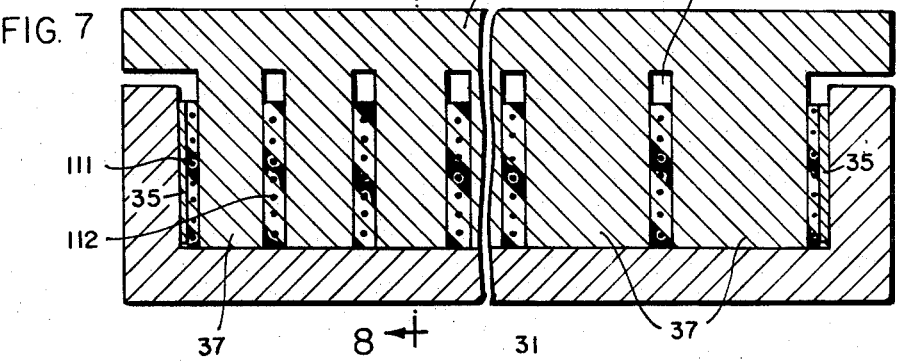
INVENTOR
LEE H. PATCHEN
BY
Dawson, Tilton, Falloy & Lungmus
ATT'YS

A METHOD FOR MAKING REINFORCED GRATING

BACKGROUND AND SUMMARY

This invention relates to a method for forming gratings, and, more particularly, to a method for forming reinforced plastic grating.

In many instances it is desirable to provide grating members such as step treads and the like of molded plastic. However, one of the problems in molding plastic gratings is achieving a product with good tensile and compressive properties. I have found that the tensile and compressive strength of a molded plastic grating can be greatly increased by embedding a lattice of filaments in the plastic body before the plastic resin material hardens. The lattice is formed of intersecting rows of filaments, each row comprising generally aligned spaced-apart filaments of fiber glass strands or the like.

However, a further problem is encountered in molding such a reinforced grating. If the resin material is poured over the strands or filaments, air bubbles may form under the filaments which will decrease the strength of the resultant product. I have found that air bubbles can be substantially eliminated from the grating by first introducing a predetermined quantity of resin material into a pan-shaped mold, and then lowering the lattice of filaments into the mold. The lowermost filaments may be immersed in the resin material, but most of the filaments will remain above the initial level of the resin. Thereafter, a core mold having generally vertically extending mold cores or fingers shaped to be received by the vertical openings in the filament lattice is lowered into the pan mold. As the fingers are lowered into the resin, the level of the resin is forced upwardly into the spaces between the fingers of the core mold and cover the remaining filaments. After the resin material hardens, the core mold can be retracted upwardly to remove the core fingers from the formed grating.

This method of forming the grating provides a very high rate of production at relatively low cost, and one mold setup allows the fabrication of grating of various depths merely by varying the amount of resin material which is initially introduced into the pan mold.

DESCRIPTION OF THE DRAWING

The invention will be explained in conjunction with an illustrative embodiment shown in the accompanying drawing, in which FIG. 1 is a perspective view of a grating formed in accordance with this invention;

FIG. 2 is a top plan view of the grating;

FIG. 3 is a fragmentary sectional view taken along the line 3—3 of FIG. 2;

FIG. 4 is a fragmentary sectional view taken along the line 4—4 of FIG. 2 which extends at right angles to the line 3—3;

FIG. 5 is an illustrative view showing one of the steps in forming the grating;

FIG. 6 is a view showing a subsequent step in the forming of the grating;

FIG. 7 is a fragmentary view similar to FIG. 6 showing the mold core after it has been lowered into the pan mold; and FIG. 8 is a fragmentary sectional view taken along line 8—8 of FIG. 7.

DESCRIPTION OF SPECIFIC EMBODIMENT

Referring now to FIGS. 1–4, the numeral 10 designates a generally rectangular reinforced plastic grating which includes longitudinally extending slat-like cross members 11, 12, 13, 14, 15, 16, 17, and 18, and transversely extending slat-like cross members 19, 20, 21, 22, 23, 24, 25, and 26. The longitudinal cross members 11–18 extend generally perpendicularly to the transverse cross members 19–26, and the intersecting cross members define openings 27.

A plurality of generally vertically aligned elongated filaments or strands are embedded in each of the longitudinal and transverse cross pieces and serve to reinforce the grating 10. For example, a vertical row 111 of longitudinally extending filaments is embedded in the longitudinal cross piece 11, the row 111 comprising individual generally vertically aligned spaced-apart filaments 111a, 111b, 111c, 111d, 111e, 111f, and 111g. Similarly, filament row 112 is embedded in cross piece 12, and the row 112 includes generally vertically aligned filaments 112a, 112b, etc. Each of the other longitudinally extending cross members 13–14 18 also encase a row of generally vertically aligned spaced-apart filaments.

Referring to FIG. 4, a transverse row of filaments is seen to be embedded in each of the transverse cross pieces 19–26. For example, a vertical filament row 126 extends within cross piece 26, filament row 126 including generally vertically aligned spaced-apart filaments 126a, 126b, 126c, 126d, 126e, 126f, and 126g. Each of the other transverse cross pieces includes a similar row of generally vertically aligned elongated filaments.

The filaments may advantageously be formed of fiberglass or similar material which will reinforce the resin material. The resin which forms the grating 10 can be any of a number of suitable plastics, such as polyesters or epoxies, and the shear strength of the grating can be increased by premixing relatively short glass fibers with the resin and filler prior to molding the resin.

Referring now to FIGS. 5–8, the grating 10 is formed by introducing a quantity of fluid resin material 30 into a pan-shaped mold 31 having a bottom wall 32 and a perimetric side wall 33. The shape and contour of the pan mold is selected according to the shape of the mold grating desired. After the resin material is poured into the pan mold, a filament lattice generally designated by the numeral 34 is lowered into the mold. The lattice 34 comprises the transversely spaced longitudinally extending vertical filament rows 111, 112, 113, 114, 115, 116, 117 and 118 and the transversely extending vertical filament rows corresponding to the transverse cross pieces 19–26 of the grating to be formed. The cross sectional view of the mold shown in FIG. 5 is taken generally along the extension of the line 3—3 of FIG. 2, and only the transverse filament row 125 is illustrated in FIG. 5. It will be understood, however, that the lattice 34 includes the other longitudinally spaced transversely extending filament rows.

The filament lattice 34 may be held by a conventional external loom frame 35 comprising bars having slots into which the filaments are inserted. The bars are arranged in the shape of the interior of the pan mold and fit flush against the sides of the mold. Although the individual filaments are illustrated as being somewhat loose, the filaments can be stretched taut and pretensioned by the loom frame if desired prior to lowering the lattice into the pan mold.

While I have described the lattice 34 as being formed of intersecting longitudinally and transversely extending filament rows, the lattice may also be considered as being formed of vertically spaced layers of generally horizontally extending filaments. For example, the lowermost longitudinally extending filaments 111g, 112g, 113g, etc. and the lowermost transversely extending filaments 125g, etc. form the lowermost layer. The longitudinally extending filaments 111f, 112f, etc. and the transversely extending filaments 125f, etc. form the next filament layer, and so on. The longitudinal filaments 111g, 112g, etc. and the transverse filaments 125g, etc. extend horizontally in generally the same plane, and the vertically layer formed thereby is therefore generally planar. Similarly, the other layers are also generally planar, and extend generally parallel to each other.

In the particular embodiment illustrated, the filaments of each layer are formed individually and cross over or under the perpendicularly related intersecting filaments of the layer. However, each layer can be formed integrally of longitudinally and transversely extending filaments.

As shown in FIG. 6, after the resin material is poured into the pan mold, the loom frame is lowered to lower the filaments into the mold. The depth of the resin material depends upon the depth of the grating to be produced, and the vertical spacing of the filaments can be varied depending upon the reinforcement desired. The depth of the resin material and the vertical spacing of the filaments may be such that after the loom frame is lowered, one or more layers of filaments will be immersed in the resin material. Most of the filament layers, however, will be positioned above the level of the resin material.

The grating is formed by a platen mold 36 which is lowered into the pan mold after the filaments are positioned. The waffle-like platen mold 36 is seen to include a plurality of vertically downwardly extending mold fingers or cores 37 which are separated by longitudinally extending gaps 38 and transversely extending gaps 39 (FIG. 8). Each of the mold cores 37 have a horizontal cross section corresponding to the openings 27 which are provided in the finished grating 10, and the fingers are sized to be received by the generally vertically extending openings in the filament lattice 34 provided by the intersecting longitudinal and transverse vertical filament rows. Although the particular mold cores illustrated have horizontal cross sections, it is to be understood that this cross section may take other shapes, for example, circular or polygonal, and still be received by the generally rectangular openings in the lattice.

As the mold fingers 37 are lowered through the lattice into the resin material, the resin is forced upwardly to fill the gaps 38 and 39 in the platen mold and to cover the filaments.

After the resin material hardens, the platen mold 36 is raised to strip the mold fingers 37 from the resin. As the loom frame 35 is lifted upwardly, the filaments slide out of the vertical slots in the frame bars. The formed grating can then be removed from the pan mold.

Preferably, the sides of the mold fingers 37 extend generally vertically to provide a non-tapering finger with uniform horizontal cross section along the entire vertical length which is immersed in the resin. I have found that even though the mold fingers do not taper, the fingers can be stripped from the hardened resin with a surprisingly low force. The mold fingers maybe made of plastic or metal.

The same pan mold and platen mold can be used to form gratings of various depths merely by varying the quantity of resin material which is poured into the pan mold. If a relatively shallow or thin grating is desired, less resin is introduced, thereby reducing the distance that the resin level is raised by the mold fingers. Conversely, if a thicker grating is desired, more resin material is used. The number of vertically spaced filaments can also be varied, depending upon the depth of the grating and the reinforcement desired.

I have found that the foregoing method substantially eliminates the formation of air bubbles in the molded grating. If the resin were poured over the filaments, air pockets or bubbles may form beneath each filament. However, in the foregoing method the resin is forced upwardly to cover the filaments, and each filament is completely surrounded by the resin.

Although the particular grating illustrated is rectangular, the grating may be formed in other shapes, depending upon the contour of the pan mold. For example, the side wall of the pan mold may be circular.

In one specific embodiment of the invention, a rectangular grating of about 4 feet by 8 feet was formed with a depth of about 3 inches. The mold fingers 37 which formed the openings 27 were 1 inch by 4 inches, and the vertical spacing of the glass fiber strands was about one-eight inch. The grating was uniformly loaded with 1,500 pounds and showed complete recovery when the load was removed.

While in the foregoing specification I have set forth a detailed description of a specific embodiment of the invention for the purpose of illustration, it is to be understood that many of the details hereingiven may be varied considerably by those skilled in the art without departing from the spirit and scope of my invention.

I claim:

1. A method of making a reinforced grating comprising the steps of:
   introducing a quantity of flowable hardenable resin material into a pan mold,
   positioning filament-supporting frame means in the pan mold, the frame means supporting a plurality of rows of elongated filaments, the rows of filaments being horizontally spaced apart and each row of filaments comprising a plurality of vertically spaced horizontally extending filaments, at least some of the filaments being positioned above the resin material,
   simultaneously lowering a plurality of generally vertically extending mold projections into the pan mold to raise the level of the resin material so that additional filaments are covered by the material, each mold projection being lowered between a pair of adjacent horizontally spaced rows of filaments,
   allowing the resin material to harden,
   removing the frame means from the hardened resin material, and
   raising the mold projections from the hardened resin material.

2. The method of claim 1 in which the filament-supporting frame means supports a plurality of second rows of elongated filaments, the second rows of filaments being horizontally spaced and extending generally perpendicularly to the first-mentioned rows of filaments, each of the second rows of filaments comprising a plurality of vertically spaced filaments which intersect with the first-mentioned rows of filaments to provide a plurality of generally vertically extending openings defined by the intersecting rows of filaments, the mold projections comprising mold fingers shaped to be received by the vertically extending openings as the fingers are lowered.

3. The method of claim 2 in which the horizontal cross section of each of the mold fingers is uniform along the vertical length thereof.

4. A method of making a reinforced plastic gearing comprising the steps of:
   introducing a quantity of flowable hardenable resin material into a pan mold, the pan having a generally horizontally extending bottom wall and a perimetric side wall extending upwardly from the bottom wall,
   positioning lattice-supporting frame means in the pan mold, the lattice comprising a first set of vertically spaced layers of generally horizontally extending generally parallel spaced-apart filaments, the filaments of each of the first layers being generally aligned in the vertical direction, and a second set of vertically spaced layers of generally horizontally extending spaced-apart filaments, the filaments of the second layers extending generally perpendicular to the filaments of the first layers, the filaments of each of the second layers being generally aligned in a vertical direction whereby a plurality of generally vertically extending openings having a generally rectangular horizontal cross section are provided between the perpendicularly related generally vertically aligned filaments of the first and second layers,
   simultaneously lowering a plurality of generally vertically extending mold fingers into the vertically extending openings to raise the level of the resin material to cover the filaments,
   allowing the resin material to harden,
   removing the frame means from the hardened resin material, and
   raising the mold fingers from the hardened resin material.

5. The method of claim 4 in which the horizontal cross section of each of the mold fingers is uniform along the vertical length thereof.

6. The method of claim 4 in which the layers are generally planar and extend generally parallel to each other.

* * * * *

PO-1050
(5/69)

UNITED STATES PATENT OFFICE
CERTIFICATE OF CORRECTION

Patent No. 3,678,147      Dated July 18, 1972

Inventor(s) Lee H. Patchen

It is certified that error appears in the above-identified patent and that said Letters Patent are hereby corrected as shown below:

In claim 4, line 37, "gearing" should be --grating--.

Signed and sealed this 17th day of October 1972.

(SEAL)
Attest:

EDWARD M. FLETCHER, JR.
Attesting Officer

ROBERT GOTTSCHALK
Commissioner of Patents